Jan. 14, 1930.   S. A. STAEGE   1,743,246
REGULATOR SYSTEM
Filed July 13, 1925
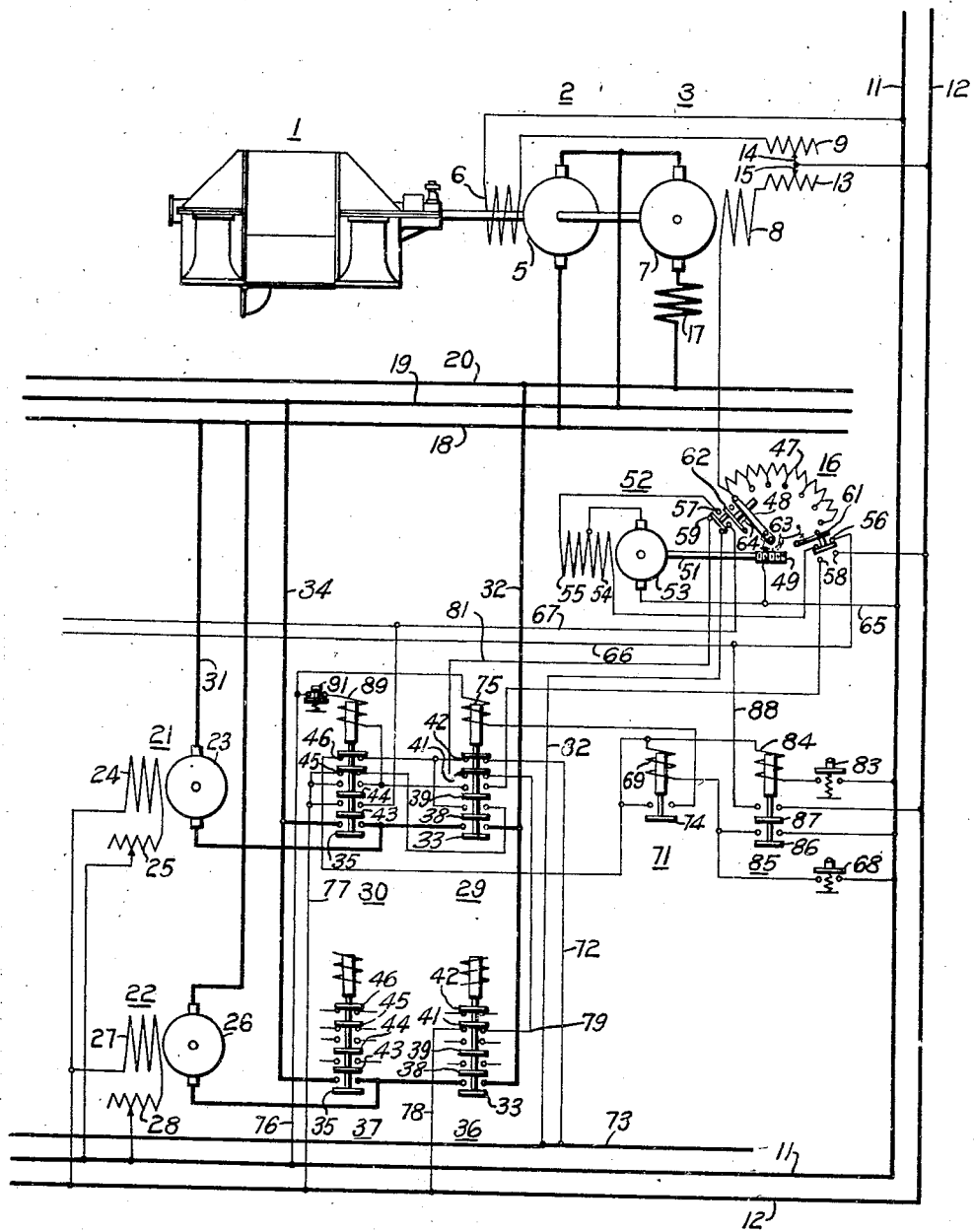
WITNESSES:
INVENTOR
Stephen A. Staege.
BY
ATTORNEY.

Patented Jan. 14, 1930

1,743,246

UNITED STATES PATENT OFFICE

STEPHEN A. STAEGE, OF PITTSBURGH, PENNSYLVANIA, ASSIGNOR TO WESTINGHOUSE ELECTRIC & MANUFACTURING COMPANY, A CORPORATION OF PENNSYLVANIA

REGULATOR SYSTEM

Application filed July 13, 1925. Serial No. 43,207.

My invention relates to regulator systems and particularly to systems for starting and accelerating the several motors of a sectional paper-mill drive, or the like.

One object of my invention is to provide a system wherein a motor may be started from rest and operated at a slow or "inching" speed, or accelerated to normal operating speed, without taking more energy from the prime mover than that required for normal speed operation of the motor.

Another object of my invention is to provide a system of the above-described character wherein a single motor may be started without affecting the operation of the remaining motors, and without shock to the system, or to the motor being started.

The motors used to operate a sectional paper-mill drive are, in practically all cases, adjustable-speed, direct-current motors, and heretofore the usual method of starting that has been employed is that of using a starting resistor and a drum-type switch for cutting out resistance in the motor circuit to increase the motor speed.

A serious objection to this system is the enormous amount of energy required from the generator in starting up the individual section motors, inasmuch as a starting torque of several times the normal running torque is required. The torque developed is a direct function of the armature current and, when the motor is standing still, sufficient series resistance must be employed to prevent the current from exceeding that value necessary to start the motor rotating.

The voltage required to produce this current is usually about one fifth of the normal operating voltage, so that four fifths of the energy taken from the generator is absorbed in starting resistance, and approximately only one fifth of the energy taken from the generator is actually used in initially starting the motor. Because of the fact that there are a number of motors of the paper-making machine that are operated from the same generator, and some of these motors may be in operation at the time that it is desired to start another motor, it is obvious that the generator voltage can not be reduced during the starting period.

In the system of my invention, I make use of a "bucking" generator or counter-electromotive force generator that is coupled to the prime mover that operates the main generator unit. The bucking generator need only be of a capacity approximately that of one of the section motors that is to be started.

In starting up one of the section motors, the bucking generator is connected in series circuit relation with the main generator and the motor to be started. The polarity of the bucking generator is the opposite of that of the main generator, whereby the voltage impressed upon the motor being started will be the difference in the voltages of the main generator and the bucking generator. This difference in voltage initially may be very small or only that value required to cause the motor to turn over slowly.

The main generator may be flat compounded or may be provided with a voltage regulator for maintaining the voltage thereof constant, irrespective of the load upon the generator, and the bucking generator may be provided with a differentially-wound field winding, whereby as load is supplied to the bucking generator, its voltage will be lowered. Lowering the voltage of the bucking generator will increase the difference in voltage between the main generator and the bucking generator and thereby increase the voltage applied to the motor being started.

Referring to the drawing, the single figure illustrates a diagrammatic view of one preferred embodiment of my invention.

In the accompanying drawing, a prime mover 1 is shown as driving a main direct-current generator 2 and a bucking generator 3. The main generator is provided with an armature winding 5 and a field winding 6, and the auxiliary, or bucking, generator is provided with an armature winding 7 and a field winding 8. The main generator field winding 6 is connected through a variable resistor or rheostat 9 to a constant-potential source of energy 11, 12 and the auxiliary generator field winding 8 is connected through a similar rheostat 13 to the source of energy 11, 12. The rheostats 9 and 13 are provided with operating contact arms 14 and 15, respectively, which, as indicated, may be jointly operated to vary both rheostats in the same manner.

In series circuit relation with the field winding 8 a motor-operated rheostat 16, is also provided, the control of which will be later explained. The auxiliary generator 3 is further provided with a differentially wound series field winding 17. Three direct-current bus bars 18, 19 and 20 are provided. The main generator armature 5 is connected to the bus bars 18 and 19, and the auxiliary generator armature 7 is connected across the bus bars 19 and 20, the bus bar 19 thus being connected to a point intermediate the two generator armatures.

A plurality of section driving motors are provided, of which two motors 21 and 22 are illustrated. The motor 21 is provided with an armature winding 23 and a field winding 24. The field winding is connected, through a variable resistor 25, to the constant potential supply conductors 11 and 12. The motor 22 is provided with an armature winding 26 and a field winding 27, the field winding being connected through an adjustable resistor 28, across the conductors 11 and 12.

Suitable "starting" and "running" switches 29 and 30 are provided. The starting switch 29 is adapted to complete a circuit through conductors 31 and 32, and contact member 33, to connect the motor armature 23 across the bus bars 18 and 20. The running switch 30 is adapted to connect the motor armature 23, through conductors 31 and 34, and contact member 35, across the constant potential bus bars 18 and 19. Similar starting and running switches 36 and 37 are provided for the section motor 22.

The starting switch 29 is provided with a number of interlocks or auxiliary contact members 38, 39, 41 and 42 and the running switch 30 is provided with a number of similar interlocks 43, 44, 45 and 46, the purpose of which will be explained hereinafter. The starting and running switches for each of the other section motors, such as the motor 22 are provided with similar switches 36 and 37 having the same interlock connections (not shown) as the switches 29 and 30.

The motor-operated rheostat 16 is provided with a resistor element 47 and an operating arm 48 that is driven from a shaft 51 by means of suitable gearing 49, in accordance with the operation of a pilot motor 52. The pilot motor 52 comprises an armature 53, and a pair of differentially related field windings 54 and 55, which are respectively connected through limit switches 56 and 57. The switches 56 and 57, as well as interlocks 58 and 59, are adapted to be governed in accordance with the movement of the rheostat arm 48. The switch-operating arms 61 and 62 of the respective limit switches 56 and 57 are biased in an upward direction by spring members 63 and 64 so as to normally maintain the limit switches 56 and 57 in a closed position and to normally hold the interlocks 58 and 59 in an open position. The reverse positions are assumed as a result of the swing of the rheostat arm 48 to the one or the other of its extreme operating positions.

One side of the pilot motor armature 53 is connected, by means of a conductor 65, to supply conductor 11; while the other side of the armature is connected through the one or the other of the differential field windings 54 and 55 to the one or the other of conductors 66 and 67. An inching button 68 is provided for each section motor, to supply the motor to be started with a low-potential current so that the motor may be run at a low speed, as will be desirable under certain conditions, such as, for threading in the machine. The inching button 68 completes a circuit from the supply conductor 11 through the operating coil 69 of relay 71, interlocks 46 and 42 and, by means of a conductor 72, to an auxiliary conductor 73.

Assuming that the conductor 73 has a potential corresponding to that of the supply conductor 12, the winding 69 will be energized, causing the relay 71 to close a circuit through contact member 74, thereby completing a circuit from the conductor 73, through the conductor 72, interlocks 42 and 46, contact member 74, actuating coil 75 of "starting" switch 29, and conductor 76 to the supply conductor 11, thereby energizing the switch 29 so as to close the contact member 33 and connect the armature 23 across the bus bars 18 and 20.

The third or auxiliary conductor 73 is energized from the conductor 12, through a circuit including conductor 78, interlocks 41 of each of the starting switches, conductor 81, interlock 59, and conductor 82. The conductor 73 will, therefore, be energized when the several interlocks in the circuit just traced are in the positions illustrated in the drawing, and will be deenergized when any one of the interlocks that connect the conductor 12 to the conductor 73, is in a reverse position. When the starting switch 29 is operated to close the circuit through the contact member 33, the circuit through the interlock 41 of the switch 29 will be broken, thus deenergizing conductor 73. At the same time that the interlock 41 is opened, however, the interlock 38 is closed, thus completing a circuit through interlocks 46, 38 and 45, and conductor 77 to the supply conductor 12, so that the operating coils 69 and 75 of the relay 71 and starting switch 29 respectively will be connected across the supply conductors 11 and 12 and will remain energized, so long as inching button 68 is depressed.

When, instead of inching the section motor 21, it is desired to start the motor and bring it up to normal operating speed, the button 83 is operated to close a circuit through the winding 84 of the relay 85. The winding 84 is connected in parallel circuit relation to the winding 69, the remainder of the circuits for the two windings being the same. As the relay 85 is operated, two circuits are formed, one through the contact member 86 and one through the contact member 87 thereof. The circuit through the contact member 86, which is in parallel circuit relation to the inching button 68, energizes the winding 69 of the relay 71, causing the starting switch 29 to be operated in the manner explained above, when the inching button 68 was used.

The operation of the relay 85 also closes a circuit from supply conductor 12 through contact member 87, conductors 88 and 66, interlock 56 of rheostat 16, differential field winding 54 and armature winding 53 of the pilot motor, and conductor 65 to the supply conductor 11, thereby energizing motor 52 and causing it to be operated in a direction to insert the resistor element 47 in circuit with the field winding 8 of the auxiliary or bucking generator 3.

When the pilot motor 52 is operated until the arm 48 occupies its extreme right-hand position as illustrated, corresponding to the rheostat resistance being fully inserted in the field-winding circuit, limit switch 56 will interrupt operation of the motor 52 and, at the same time, the interlock 58 will be closed. Closing the interlock 58 completes a circuit from supply conductor 12 through interlock 58 and 39, and winding 89 of the run switch 30, "stop" button 91, and conductor 76 to supply conductor 11, thereby operating switch 30 to close contact member 35 and connect motor armature 23 by means of conductors 31 and 34, across the constant potential bus bars 18 and 19.

The operation of the switch 30 causes interlocks 43 and 44 to close and causes interlocks 45 and 46 to open. The closing of interlock 43 causes the conductor 67 to be energized in accordance with the voltage of the supply conductor 12 and completes a circuit through the limit switch 57, differential field winding 55 and armature 53 of the pilot motor, and conductor 65 to supply conductor 11, thus energizing the pilot motor 52 and causing it to operate the arm 48 in a counter-clockwise direction, to remove the resistor element 47 from the field-winding circuit and thus reduce the voltage across the bus bars 18 and 20 to a minimum value, so that another section motor may safely be connected for starting purposes.

The interlock 44 completes a circuit from supply conductor 12 through winding 89, "stop" button 91 and conductor 76 to the supply conductor 11, so that the run switch 30 is maintained in a closed position until the "stop" button 91 is opearted to break the circuit. The opening of interlock 45 interrupts the circuit from supply conductor 12 through the interlocks 38 and 46 to the windings 69 and 84 of the relays 71 and 85, respectively, so that these relays are deenergized, thus causing the relays 71 and 85 and the starting switch 29 all to be thrown to their open position. Opening the interlock 46 also interrupts the circuit just traced through interlock 38, and further interrupts the circuit through interlock 42. Interrupting the circuit through the interlock 42 prevents any of the windings 69, 84 and 75 from being connected to the conductor 73 while the run switch 30 is in its closed position, thereby preventing the starting switch 29 from being again operated until the switch 30 has been thrown to its inoperative position.

One terminal of the main generator (the one connected to bus bar 18) may be connected to the corresponding terminal of each of the section motors, as illustrated, this connection being a permanent one. When the starting magnetic contactor (such as 29) for a given section motor is operated, it serves to connect the other terminal of the motor to that terminal of the bucking generator (the one connected to bus bar 20) which corresponds approximately in voltage to the connected terminal of the main generator. This impresses a low voltage upon the motor being started since the magnetic contactor for starting the motor is operative only when the rheostat 16 is entirely in the circuit of field winding 8 of the bucking generator. The flow of current from the bucking generator through the field winding 17 causes the voltage of this generator to be decreased, thereby increasing the voltage impressed upon the motor being started at the same time.

The pilot motor 52 operates the rheostat 16 to bring the voltage of the generator 3 substantially to zero, so that, at the time the rheostat is completely in the field circuit, the potential across the bus bars 18 and 20 is substantially that across the bus bars 18 and 19. The closing of the interlock 58, upon the completed operation of the pilot motor, causes the magnetic contactor 30 to operate and to connect the section motor 21 across the constant potential bus bars 18 and 19.

When operating the section motor at inching speed, the field rheostat for the bucking generator is not actuated, but remains in its normal position. The starting up and rotating at slow speed of the section motor is accomplished automatically through the inherent characteristics of the machine itself so long as the magnetic contactor remains closed to connect the main and bucking generators in reverse series relation with each other. When the section motor is to be started and brought up to normal speed, the pilot motor 52, controlling the rheostat in the shunt field circuit of the bucking generator, is caused to operate as described above, thereby automatically reducing the voltage of the bucking generator to substantially zero, and increasing the voltage impressed upon the motor to the voltage of the main generator, and then connecting the section motor directly to the main generator.

The interlocking means that are operated by the magnetic contactors prevent any motor from being connected either to the main generator or to the bucking generator, while another motor is connected to the bucking generator, for inching or during acceleration. Inasmuch as no starting resistances are provided, it would be unsafe to permit the section motor to be connected to the main generator, except when the counter electro-motive force of the motor corresponds substantially to that of the source to which it is to be connected. The interlocks also provide that as soon as a section motor is brought up to speed and connected to the main generator, the rheostat in the field circuit of the bucking generator automatically returns to its normal position, and the interlocks thereupon establish circuits permitting another section motor to be started in like manner.

Inasmuch as paper-making machines are frequently operated over a wide range of speed, the voltage of the main generator is required to be varied over a substantial range to vary the speed of the entire paper-making machine, as required. In order that the voltage of the auxiliary or bucking generator may correspond substantially to that of the main generator when the rheostat 16 is in its normal or "all out" position, the variable resistors 9 and 13, respectively connected in the field circuits of the main generator and the auxiliary generator, are so connected as to be jointly operated. As the voltage of the main generator is varied, through the adjustment of rheostat 9, a like adjustment in the voltage of the bucking generator is made, by adjustment of rheostat 13, so that the voltage of the bus bars 18 and 20 will be the same, regardless of the voltage of the main generator.

Many modifications may be made in the arrangement and location of the parts within the spirit of my invention, and I do not wish to be limited other than by the scope of the appended claims.

I claim as my invention:

1. In a starting system for direct-current motors, a main generator designed to operate at a substantially uniform voltage, an auxiliary generator connected in voltage opposition with said main generator, a motor, means for connecting said motor in circuit with both of said generators, and means for connecting said motor to said main generator only.

2. In a starting system for direct-current motors, a main generator designed to operate at a substantially constant voltage, an auxiliary generator connected in voltage opposition with said main generator, means for connecting said motors in circuit with said generators, said last-named means being operative only when substantially full field conditions obtain upon said auxiliary generator, means energized upon the operation of said last-named means for decreasing the auxiliary generator field to substantially zero, and means operating upon the occurrence of minimum field for connecting said motor to said main generator only.

3. In a control system for direct-current motors, a motor to be controlled, a substantially constant-voltage source of energy, and a variable-voltage source of energy, and means for connecting said motor to said two sources connected in series circuit relation and in voltage opposition, said last-named means being operative only under substantially equal-voltage conditions of said two sources of energy.

4. In a control system for direct-current motors, a motor to be controlled, a substantially constant-voltage source of energy, and a variable-voltage source of energy, means for connecting said motor to said two sources connected in series circuit relation and in voltage opposition, said last-named means being operative only under substantially equal-voltage conditions of said two sources of energy, means operative upon said connection being made for decreasing the voltage of said second defined source of energy to a minimum, and means for connecting said motor to said constant-voltage source only.

5. In combination, a motor, a substantially constant-voltage source of energy and a variable-voltage source of energy connected in opposition to each other, means for connecting said motor in series-circuit relation with said sources of energy, means for gradually decreasing the voltage of said variable-voltage source, and automatic means responsive to the operation of said last named means for connecting said motor to said constant-voltage source only.

6. In combination, a motor, a substantially constant-voltage of energy, and a variable source of energy, switching means for connecting said motor to both of said sources, automatic means actuated upon the operation of said switching means for varying the potential of said second source, and means responsive to the operation of said automatic means for connecting said motor to said constant-voltage source.

7. In combination, a motor, two sources of electrical energy, switching means for connecting said motor to both of said sources, means actuated upon the operation of said switching means for varying the voltage of one of said sources, and means actuated upon the operation of said last-named means for connecting said motor to the other of said sources.

8. In combination, a motor, a substantially constant-voltage generator and an auxiliary generator connected in voltage opposition, means for simultaneously varying the excitation of said generators, means for independently varying the excitation of said auxiliary generator, means for connecting said motor in series-circuit relation with said generators, and means for connecting said motor in circuit with said constant-voltage generator only.

9. In combination, a motor, a substantially constant-voltage generator and an auxiliary generator connected in voltage opposition, said auxiliary generator being provided with a shunt field winding and with a differentially wound series field winding, resistor means for varying the excitation of said auxiliary generator, means for connecting said motor in circuit with both of said generators, and means for connecting said motor to said constant voltage generator.

10. In combination, a plurality of motors, a power circuit and a starting circuit, separate starting switches for connecting each motor to said starting circuit, means effective upon the operation of one of said starting switches for rendering the remaining switches inoperative, and means for rendering said switches inoperative upon the occurrence of predetermined voltage conditions of said starting circuit.

11. In combination, a plurality of motors, a starting circuit, separate switching means for connecting each motor to said starting circuit, and means operative upon the closing of one of said switching means for rendering the remaining switches inoperative until said switching means is again opened.

12. In combination, a plurality of motors, a power circuit and a starting circuit, separate starting switches for connecting each motor to said starting circuit, separate running switches for connecting each motor to said power circuit, means operative upon the closing of one of said starting switches for rendering the other starting switches inoperative, and means operative upon the occurrence of predetermined starting-circuit conditions for closing the motor running switch and for opening the motor starting switch.

13. In combination, a plurality of motors, a power circuit and a starting circuit, separate switching means for connecting each motor to said starting circuit, separate switching means for connecting each motor to said power circuit, means actuated upon the operation of said first-named switching means for automatically bringing the voltage of said starting circuit to substantially the voltage of said power circuit, means energized upon the operation of said last-defined means for actuating said second-named switching means, means effective upon the operation of said second-named switching means to disconnect the motor from said starting circuit, and means effective upon the operation of said second-named switching means for reducing the voltage of said starting circuit to a minimum.

14. In combination, a plurality of motors, a power circuit and a starting circuit, separate starting switches for connecting each motor to said starting circuit, separate running switches for connecting each motor to said power circuit, electro-responsive means for varying the voltage of said starting circuit, means actuated upon the operation of a motor-starting switch for causing said electro-responsive means to bring the voltage of said starting circuit to substantially the voltage of said power circuit, and means actuated by said electro-responsive means for connecting the motor-running switch and disconnecting the motor-starting switch.

In testimony whereof, I have hereunto subscribed my name this 8th day of July 1925.

STEPHEN A. STAEGE.